3,687,638
PROCESS FOR RECOVERING SODIUM AND SULFATE VALUES FROM SCHOENITE-CONVERSION END LIQUORS
Ulrich E. G. Neitzel, Ogden, Utah, assignor to Great Salt Lake Minerals and Chemicals Corporation, New York, N.Y.
Filed Nov. 20, 1968, Ser. No. 777,359
Int. Cl. B01d 9/00
U.S. Cl. 23—296                      16 Claims

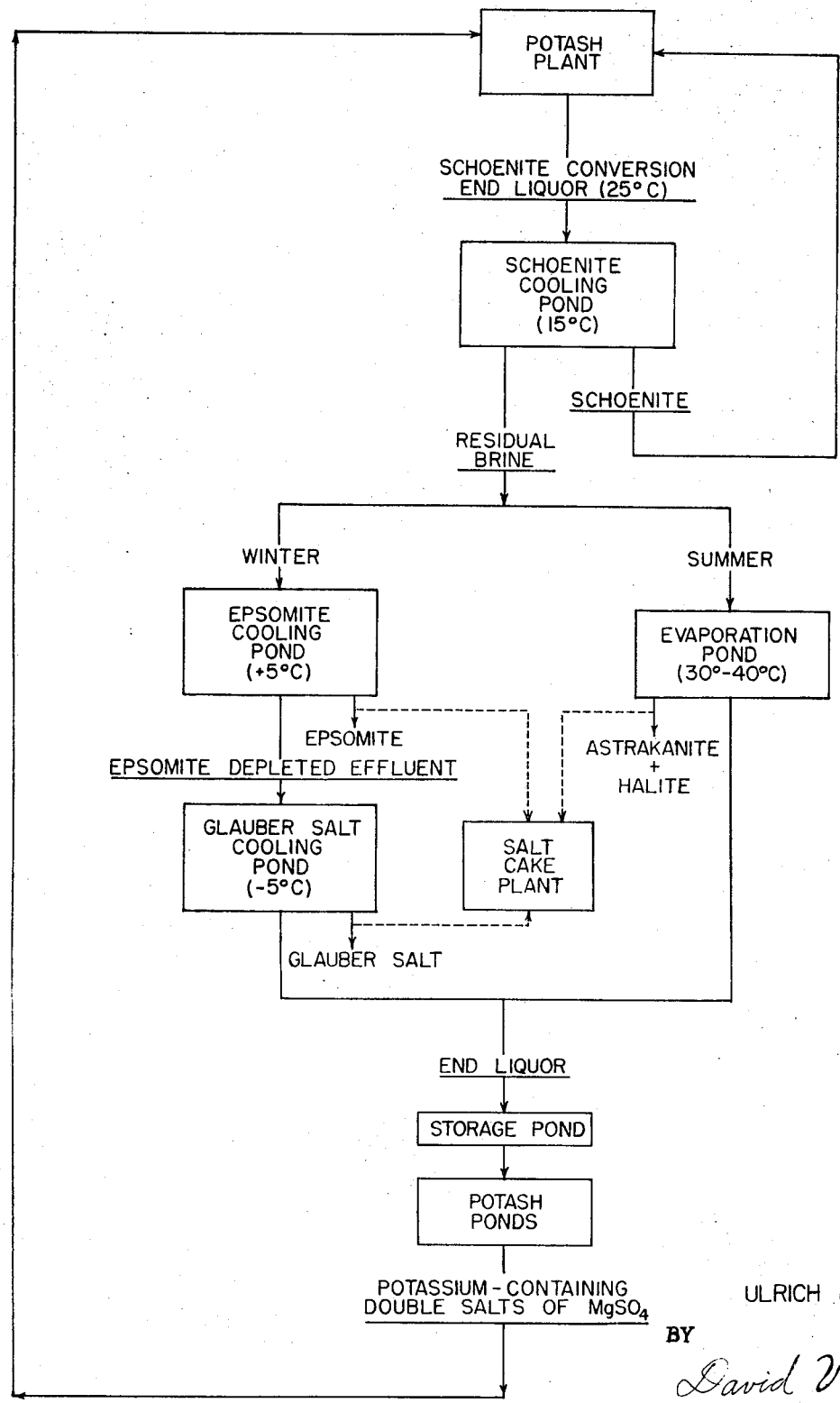

ABSTRACT OF THE DISCLOSURE

A high-grade crystal crop, usually schoenite, is recovered from schoenite-conversion end liquor for recycle to the potassium sulfate plant that produces the end liquor. The resulting residual brine is treated to recover high-sulfate, low-potassium crystal crops suitable for use as feed material for the production of salt cake (sodium sulfate).

---

Commonly assigned co-pending U.S. patent application Ser. No. 735,840, filed June 10, 1968, discloses and claims a process for evaporating natural brines, such as those taken from the Great Salt Lake of Utah, in solar ponds to produce potassium-containing double salts of magnesium sulfate. Commonly assigned co-pending U.S. patent application Ser. No. 799,376, filed Feb. 14, 1969, discloses and claims a process for treating potassium-containing double salts, such as those resulting from the process of the aforementioned application Ser. No. 735,-840, to produce schoenite and then potassium sulfate. Also produced by the treatment of these double salts is a schoenite-conversion end liquor containing substantial concentrations of potassium and sulfate. This end liquor is recycled to the solar evaporation ponds for the purpose of recovering the potassium and sulfate values, even though it also contains appreciable quantities of undesirable constituents, notably sodium, magnesium, and chloride.

BACKGROUND OF THE INVENTION

Field: The present invention relates to the recovery of valuable salts from natural brine and is directed to the recovery of feed constituents for the production of both potassium sulfate and sodium sulfate from the schoenite-conversion end liquor effluent from a potassium sulfate plant. It specifically provides a method for recovering sulfate-containing materials from such end liquors free from potassium.

State of the art: It is known to produce potassium sulfate from potassium-containing double salts of magnesium sulfate by procedures which involve contacting the double salts with a saturated sulfate solution to convert them to schoenite while producing a schoenite-conversion end liquor. The schoenite is then converted to potassium sulfate.

It is further known to treat the schoenite-conversion end liquor in various ways to produce additional potassium salts, as well as sodium salts. U.S. Pat. No. 3,004,826, for example, teaches a method whereby schoenite-conversion end liquor is treated by dissolving ground kainite material therein. Additional schoenite is thereby produced in admixture with NaCl. The resulting mother liquor is discarded. In the production of potassium sulfate by the conversion of schoenite, it is essential that the schoenite feed material be essentially free from NaCl. Similarly, the feed materials for the production of salt cake should be essentially free from potassium contaminant.

The aforementioned co-pending application Ser. No. 799,376, avoids the production of impure schoenite by recycling the schoenite-conversion end liquor back to the solar ponds for recovery of the potassium values remaining therein. It is economically important that the greatest possible portion of the potassium contained in the recycled end liquor be returned to the potassium sulfate plant.

The recycled schoenite-conversion end liquor contains substantial concentrations of sodium and sulfate, however, and is a convenient source of feed materials for a sodium sulfate plant. There is thus a need for a process which effects a clean recovery of sulfate minerals from schoenite-conversion end liquor, without interfering with the recycling of potassium values through the potassium sulfate plant and the solar ponds.

SUMMARY OF THE INVENTION

According to the present invention, schoenite-conversion end liquor is first introduced to a cooling pond wherein it is allowed to cool sufficiently to drop a high-grade schoenite crystal crop, i.e. a crystal crop containing at least about 70 and typically about 85 to about 95 percent by weight schoenite, the remainder being substantially all epsomite. This crystal crop is a valuable product even if it contains a large amount of epsomite, because epsomite is tolerable in and is often a preferred constituent of the feed to a potassium sulfate plant.

Crystallization of schoenite from the plant end liquor produces a residual brine, which contains the constituents, particularly the sulfate, required for producing salt cake (sodium sulfate) but is too contaminated with respect to potassium to be directly suitable as feed to a salt cake plant. According to this invention, it has been found that, surprisingly, such residual brines may be evaporated and/or cooled to crystallize sodium-containing and sulfate-containing minerals, without crystallizing significant additional quantities of potassium-containing minerals. The residual brine is thus treated by appropriate cooling or evaporation procedures to recover crystal crops rich in sulfate but containing essentially no potassium contaminant. These salts are excellent feed materials for a salt cake plant. The crystallization of sulfate-containing minerals is accomplished under conditions which produce an end liquor somewhat depleted with respect to sodium, but which retains substantially all of the potassium initially carried by the aforementioned residual brine, together with sufficient sulfate that it remains a suitable brine for recycle to a solar pond system employed for the production of potassium-containing double salts of magnesium sulfate. Accordingly, the process of the present invention may be applied to the recycling of schoenite-conversion end liquors produced by the cyclic process disclosed in the aforesaid copending application Ser. No. 799,376 without significantly affecting any of the details of said cyclic process.

The precise manner in which the residual brine is treated to recover feed materials for a salt cake plant depends upon the prevailing climate and seasonal conditions. One procedure involves cooling of the residual brine to a temperature approaching freezing or below to crystallize epsomite and Glauber salt. This procedure is normally employed during the winter season or during those portions of the year when cold temperatures of this kind prevail for substantial time intervals during the night. During the portions of the season or day when evaporation conditions prevail, an alternative procedure may be employed whereby a mixture of astrakanite and halite is produced.

The schoenite conversion end liquors treated in accordance with this invention vary widely in composition, depending upon the composition of the feed to the potassium sulfate plant. In general, any brine similar in composition to those resulting from the conversion of potassium minerals to a hydrated potassium-magnesium sulfate, particularly those known in the art as schoenite-conversion end liquors, may be so treated. In any event, the end liquor contains, as essential constituents, various proportions of dissolved magnesium sulfate, potassium, sodium, and chloride. Table 1 reports the chemical analyses, in weight percent, of various simulated schoenite conversion end liquors representative of those which result from producing schoenite from crystal crops containing potassium-containing double salts of magnesium sulfate in admixture with epsomite and sodium chloride. Table 2 reports the compositions of the same end liquors in moles of particular dissolved salts per 1,000 moles $H_2O$.

TABLE 1.—COMPOSITION OF SIMULATED SCHOENITE CONVERSION END LIQUORS

[In weight percent]

|  | Mg | SO$_4$ | K | Na | Cl |
|---|---|---|---|---|---|
| End liquor: |  |  |  |  |  |
| I | 3.25 | 12.81 | 2.78 | 5.72 | 11.35 |
| II | 3.41 | 12.05 | 2.66 | 5.28 | 11.83 |
| III | 3.73 | 11.20 | 2.57 | 4.70 | 12.16 |
| IV | 4.06 | 10.67 | 2.46 | 3.92 | 12.22 |
| V | 4.32 | 9.86 | 2.34 | 3.44 | 12.70 |
| VI | 4.58 | 9.05 | 2.21 | 3.04 | 13.40 |
| Range | 3.25-4.58 | 12.81-9.05 | 2.78-2.21 | 5.72-3.04 | 11.35-13.40 |

TABLE 2.—COMPOSITION OF SIMULATED SCHOENITE CONVERSION END LIQUORS

[In moles/1,000 moles $H_2O$]

|  | MgSO$_4$ | MgCl$_2$ | K$_2$Cl$_2$ | Na$_2$Cl$_2$ |
|---|---|---|---|---|
| End liquor: |  |  |  |  |
| I | 37.5 | 0 | 10.0 | 35 |
| II | 35 | 5 | 9.5 | 32 |
| III | 32 | 10 | 9.0 | 28 |
| IV | 30 | 15 | 8.5 | 23 |
| V | 27.5 | 20 | 8.0 | 20 |
| VI | 25 | 25 | 7.5 | 17.5 |
| Range | 25-37.5 | 0-25 | 7.5-10 | 17.5-35 |

As the first step of the claimed process, the conversion end liquor is cooled from the temperature at which it leaves the plant, i.e. about 20 to about 30° C. and typically about 25° C. Cooling is effected in a large pond, either at night or during the cooler parts of the season. Flow into and out of the pond is regulated so that the brine in the pond is maintained at a temperature sufficient to cause the crystallization of essentially all of the schoenite from the brine. As previously noted, it has been observed that once schoenite ceases to crystallize from such an end liquor, appreciable quantities of sulfate may be removed by additional cooling or evaporation, without removing additional potassium. For purposes of this disclosure, it is considered that all of the schoenite has been removed from a brine when additional cooling or evaporation causes no appreciable additional crystallization of schoenite.

The next crystal species to crystallize after schoenite is epsomite. Although it is possible to control the cooling step to effect an essentially clean separation of schoenite, such careful control is not normally required for the reasons explained hereinbefore. Maximum recovery of schoenite is usually preferred, provided the only significant contaminant is epsomite. Accordingly, the temperature of the first cooling pond may be established at a level which crystallizes all of the schoenite and some epsomite from solution. A temperature of about 15° C. has been found consistently effective for this purpose. The temperature can be varied from this point plus or minus about 5° C. without seriously adversely affecting the remainder of the process. At higher temperatures, less schoenite is recovered, about 25° C. being the practical upper limit of temperature in most instances. Lower temperatures produce proportionately more epsomite. Although it is often possible to cool the conversion end liquor to as low as about 10° C. without causing the precipitation of appreciable quantities of other contaminants, it is usually desired to limit the amount of epsomite in the schoenite crystal crop to about 30 percent by weight or less.

The schoenite crystal crop resulting from the aforementioned cooling step may be harvested and recycled to the potassium sulfate plant which produced the initial schoenite-conversion end liquor. The residual brine resulting this step may then be treated in one or more of the following alternative ways:

(A) It may be cooled only sufficiently to cause the crystallization of epsomite without substantial concurrent crystallization of other salts, notably Glauber salt. The remaining brine is then separated from the epsomite and cooled sufficiently to cause the crystallization of Glauber salt.

(B) It may be cooled sufficiently to cause both epsomite and Glauber salt to crystallize. If desired, the mixture of the crystallized salts together with entrained brine may be warmed sufficiently to cause the Glauber salt to redissolve. The resulting $Na_2SO_4$ brine may then be removed, leaving the epsomite behind. Alternatively, the $Na_2SO_4$ brine may be left in contact with the $MgSO_4$ crystal crop sufficiently long to produce astrakanite

$(Na_2SO_4 \cdot MgSO_4 \cdot 4H_2O)$ (C) It may be subjected to evaporation, typically between about 25 and about 45 but rarely above 50° C., to cause the crystallization of epsomite and halite. At sufficiently high temperatures, above about 30° C., these salts react to produce astrakanite, which is generally harvested in admixture with appreciable quantities of halite.

No matter which of the foregoing alternatives is selected for treatment of the residual brine, the end liquor resulting from the treatment retains essentially all of the potassium initially present in the residual brine together with sufficient sulfate that it is suitable for recycle through the solar evaporation ponds for the production of potassium-containing double salts of magnesium sulfate. The crystal crops produced are high in sulfate and are essentially free from potassium or other contaminants. They are thus excellent feed materials for a salt cake plant.

The cooling procedures are normally preferred during the winter season, but during the evaporation season it is usually more economical and convenient to evaporate the residual brine to produce astrakanite. The cooling procedure produces essentially pure fractions of epsomite and/or Glauber salt and results in the substantial removal of these salts from the residual brine. The evaporation procedure results in the production of astrakanite in admixture with substantial quantities, e.g. about 10 to about 30 percent by weight, of sodium chloride.

To produce epsomite from the residual brines, the brines must be cooled to at least below about 20° C. depending upon the magnesium sulfate concentration of the brine. Cooling below about 5° C. results in the concurrent crystallization of some Glauber salt. Cooling of the solution to about 5° C. is generally effective to produce a substantially pure epsomite product; i.e., a product containing about 80 to about 90 percent by weight epsomite, with the remainder being principally Glauber salt. The epsomite-depleted brine may then be transferred to a separate pond and subjected to additional cooling for the production of Glauber salt. Although lower temperatures produce more Glauber salt, normal winter temperatures below about 0° C. produce adequate quantities of material. Cooling of the epsomite-depleted brine to below about −5° C. is usually feasible and produces significantly more Glauber salt.

Although complete removal of epsomite and/or Glauber salt is not an object of this invention and is normally not desirable, the practice of this invention does produce commercial quantities of sulfate feed materials for a salt cake plant. In the specific case of schoenite-conversion end liquors treated in the vicinity of the Great Salt Lake of Utah, the practice of this invention normally resulted in the removal of about 50 to about 70 percent of the sulfate initially present in the schoenite-conversion end liquor. The end liquor produced by this invention is at least as suitable for recycle to a pond system of the type disclosed and claimed by the aforementioned co-pending patent application Ser. No. 735,340, as is the initial schoenite-conversion end liquor, typically containing about 20 to about 30 moles $MgCl_2$, about 12 to about 16 moles $MgSO_4$, about 6.5 to about 9 moles $K_2Cl_2$ and about 18 to about 25 moles $Na_2Cl_2$ per 1,000 moles $H_2O$. It ordinarily contains a ratio of potassium to sodium of about .25 to about .4, and a ratio of potassium to magnesium of about .15 to about .25.

DESCRIPTION OF THE DRAWING

The drawing is a flow sheet illustrating what is presently regarded as the best mode for carrying out the invention.

DESCRIPTION OF THE ILLUSTRATED EMBODIMENT

Referring to the drawing, schoenite-conversion end liquor at about 25° C. is pumped from a potassium sulfate potash plant to a schoenite-cooling pond. The cooling pond is operated during both the evaporation (summer) and non-evaporation (winter) seasons. During the winter season, the flow rates into and out of the cooling pond are adjusted so that the temperature of the brine in the pond is maintained at about 15° C. During the summer season, residual liquor is withdrawn from the pond only during the colder portions of the day when the pond brine is at the appropriate temperature. It should be understood that the cooling ponds and evaporation ponds illustrated by the flow sheet may actually represent a plurality of ponds arranged for series or parallel flow as needed to provide appropriate residence time of the solution in the pond and to adjust the ratio of volume to surface area of the brine as required. It is also usually desired that alternate ponds be available so that they may periodically be drained, thereby facilitating the harvesting of crystal crops therefrom.

Schoenite harvested from the cooling pond is recycled to the potash plant as feed material. The residual brine from the schoenite-cooling pond is treated in different ways during the winter and summer seasons as indicated by the drawing.

During the winter, the residual brine from the schoenite-cooling pond is transferred to an epsomite-cooling pond under flow conditions which establish and maintain a temperature of about 5° C. for the brine in the pond. As a result, a substantially pure epsomite crystal crop, free from potassium impurity, is obtained. The epsomite-depleted effluent brine from this pond is transferred to a Glauber salt-cooling pond. End liquor is withdrawn from the Glauber salt-cooling pond at temperatures of −5° C. or lower. This end liquor is transferred to a storage pond for distribution to potash evaporation ponds at the beginning of the next evaporation season. In the potash ponds, the end liquor is mingled with other brines and is evaporated to produce potassium-containing double salts of magnesium sulfate. These double salts are ultimately harvested and fed to the potash plant for the production of potassium sulfate.

The epsomite and Glauber salt crystal crops may be harvested and employed as feed materials for the production of salt cake ($Na_2SO_4$).

During the evaporation season, the residual brine from the schoenite-cooling pond is transferred to an evaporation pond wherein it is subjected to evaporative concentration at temperatures above about 30° C. The temperature of the brine in this pond may be allowed to reach much higher temperatures; e.g., 50° C. or higher. Astrakanite is produced in this pond, either directly or as a result of the reaction between epsomite and halite crystallizing from the concentrated brine. In any event, there is produced an end liquor suitable for cycling to the potash ponds and a crystal crop comprising astrakanite and halite, substatially free from potassium impurity. This crystal crop is suitable as feed material to a process for the production of salt cake.

The invention will be better understood by reference to the following specific examples.

EXAMPLE 1

A schoenite conversion end liquor with the composition designated II in Tables 1 and 2 is treated in accordance with the winter sequence illustrated by the drawing. The end liquor is thus cooled in successive steps to 15° C., 5° C. and minus 5° C., respectively. Cooling is done in small test ponds having a capacity of about 10 to about 20 acres. The end liquor is fed to the first, or "schoenite-cooling," pond at about 25° C. and residual brine is withdrawn from this pond at about 15° C. Residence time of the brine in this pond is about 1 day. Residence time of the brine in the "epsomite-cooling" pond is also about 1 day, while residence time of the eposmite-depleted brine in the "Glauber salt cooling" pond is about 1 week. Analyses of the effluents from the various cooling ponds are reported in Table 3. The end liquor composition (the effluent from the Glauber salt cooling pond) is reported on a 1,000 moles $H_2O$ basis to give a direct comparison between the compoistions of the schoenite-conversion end liquor and the end liquor from the instant process.

TABLE 3.—COMPOSITIONS OF BRINES AND CRYSTAL CROPS RESULTING FROM COOLING SCHOENITE-CONVERSION END LIQUOR IN STEPS (MOLES)

| | Starting end liquor | Schoenite cooling pond effluent (+15° C.) | Epsomite cooling pond effluent (−5° C.) | Glauber salt cooling pond effluent (−5° C.) | Final end liquor |
|---|---|---|---|---|---|
| Brine: | | | | | |
| $MgSO_4$ | 35 | 29 | 24 | 14 | 16.53 |
| $MgCl_2$ | 5 | 8 | 8 | 18 | 21.3 |
| $K_2Cl_2$ | 9.5 | 6.5 | 6.5 | 6.5 | 7.68 |
| $Na_2Cl_2$ | 32 | 32 | 32 | 22 | 26.0 |
| $H_2O$ | 1,000 | 982 | 947 | 847 | 1,000 |
| Crystallized solid: | | | | | |
| Schoenite | | 3 | | | |
| Epsomite | | | 5 | | |
| Glauber salt | | | | 10 | |

EXAMPLE II

The procedure of Example I is repeated using a schoenite-conversion end liquor of the composition designated III in Tables 1 and 2. The compositions of the effluent streams and the quantity of salts harvested in the various crystal crops is repoted in Table 4.

TABLE 4.—COMPOSITIONS OF BRINES AND CRYSTAL CROPS RESULTING FROM COOLING SCHOENITE-CONVERSION END LIQUOR IN STEPS (MOLES)

|  | Starting end liquor | Schoenite cooling pond effluent (+15° C.) | Epsomite cooling pond effluent (−5° C.) | Glauber salt cooling pond effluent (−5° C.) | Final end liquor |
|---|---|---|---|---|---|
| Brine: | | | | | |
| $MgSO_4$ | 32 | 27 | 22 | 14.0 | 16.10 |
| $MgCl_2$ | 10 | 12.5 | 12.5 | 20.5 | 23.6 |
| $K_2Cl_2$ | 9.0 | 6.5 | 6.5 | 6.5 | 7.47 |
| $Na_2Cl_2$ | 28 | 28 | 28 | 20 | 23.0 |
| $H_2O$ | 1,000 | 985 | 950 | 870 | 1,000 |
| Crystallized solid: | | | | | |
| Schoenite | | 2.5 | | | |
| Epsomite | | | 5 | | |
| Glauber salt | | | | 8 | |

EXAMPLE III

The procedure of Example I is repeated with a schoenite-conversion end liquor of the composition designated IV in Tables 1 and 2. The compositions of the effluent brine streams and the quantities of the crystal crops produced are reported in Table 5.

TABLE 5.—COMPOSITIONS OF BRINES AND CRYSTAL CROPS RESULTING FROM COOLING SCHOENITE-CONVERSION END LIQUOR IN STEPS (MOLES)

|  | Starting end liquor | Schoenite cooling pond effluent (+15° C.) | Epsomite cooling pond effluent (−5° C.) | Glauber salt cooling pond effluent (−5° C.) | Final end liquor |
|---|---|---|---|---|---|
| Brine: | | | | | |
| $MgSO_4$ | 30 | 26 | 17 | 16 | 17.50 |
| $MgCl_2$ | 15 | 17 | 17 | 18 | 19.70 |
| $K_2Cl_2$ | 8.5 | 6.5 | 6.5 | 6.5 | 7.11 |
| $Na_2Cl_2$ | 23 | 23 | 23 | 22 | 24.1 |
| $H_2O$ | 1,000 | 988 | 925 | 915 | 1,000 |
| Crystallized solid: | | | | | |
| Schoenite | | 2 | | | |
| Epsomite | | | 9 | | |
| Glauber salt | | | | 1 | |

EXAMPLE IV

Schoenite-conversion end liquor with the composition designated II in Tables 1 and 2 is treated in accordance with the summer sequence illustrated by the drawing. Thus, it is subjected to evaporative concentration at 35° C. subsequent to being cooled in the schoenite-cooling pond. The compositions of the effluent brine streams and the quantities of the crystal crops produced are reported in Table 6. The final end liquor (evaporation pond effluent) is reported on a 1000 moles $H_2O$ basis for purposes of comparison.

TABLE 6.—COMPOSITIONS OF BRINES AND CRYSTAL CROPS RESULTING FROM COOLING SCHOENITE-CONVERSION END LIQUOR AND EVAPORATING RESIDUAL BRINE (MOLES)

|  | Starting end liquor | Schoenite Cooling pond effluent (+15° C.) | Evaporation pond effluent (35° C.) | Final end liquor |
|---|---|---|---|---|
| Brine: | | | | |
| $MgSO_4$ | 35 | 29 | 13 | 18 |
| $MgCl_2$ | 5 | 8 | 16 | 22.2 |
| $K_2Cl_2$ | 9.5 | 6.5 | 6.5 | 9.0 |
| $Na_2Cl_2$ | 32 | 32 | 15.17 | 21 |
| $H_2O$ | 1,000 | 982 | 722 | 1,000 |
| Removed: | | | | |
| Schoenite | | 3 | | |
| Astrakanite | | | 8 | |
| Halite | | | 8.83 | |
| Crystallized $H_2O$ | | 18 | 32 | |
| Evaporated $H_2O$ | | | 228 | |

EXAMPLE V

The procedure of Example IV is repeated with schoenite-conversion end liquor of the composition designated III in Tables 1 and 2. Compositions of the effluent brine streams and the quantities of the crystal crops produced are reported in Table 7.

TABLE 7.—COMPOSITIONS OF BRINES AND CRYSTAL CROPS RESULTING FROM COOLING SCHOENITE-CONVERSION END LIQUOR AND EVAPORATING RESIDUAL BRINE (MOLES)

|  | Starting end liquor | Schoenite Cooling pond effluent (+15° C.) | Evaporation pond effluent (35° C.) | Final end liquor |
|---|---|---|---|---|
| Brine: | | | | |
| $MgSO_4$ | 32 | 27 | 13 | 18 |
| $MgCl_2$ | 10 | 12.5 | 19.5 | 27.0 |
| $K_2Cl_2$ | 9 | 6.5 | 6.5 | 9 |
| $Na_2Cl_2$ | 28 | 28 | 13.72 | 19 |
| $H_2O$ | 1,000 | 985 | 722 | 1,000 |
| Removed: | | | | |
| Schoenite | | 2.5 | | |
| Astrakanite | | | 7 | |
| Halite | | | 7.28 | |
| Crystallized $H_2O$ | | 15 | 28 | |
| Evaporated $H_2O$ | | | 235 | |

Example VI

The procedure of Example IV is repeated with schoenite-conversion end liquor of the composition designated IV in Tables 1 and 2. Compositions of the effluent brine streams and the quantities of crystal crops produced are reported in Table 8.

TABLE 8.—COMPOSITIONS OF BRINES AND CRYSTAL CROPS RESULTING FROM COOLING SCHOENITE-CONVERSION END LIQUOR AND EVAPORATING RESIDUAL BRINE (MOLES)

|  | Starting end liquor | Schoenite Cooling pond effluent (+15° C.) | Evaporation pond effluent (35° C.) | Final end liquor |
|---|---|---|---|---|
| Brine: | | | | |
| $MgSO_4$ | 30 | 26 | 13 | 18 |
| $MgCl_2$ | 15 | 17 | 23.5 | 32.5 |
| $K_2Cl_2$ | 8.5 | 6.5 | 6.5 | 9 |
| $Na_2Cl_2$ | 23 | 23 | 11.56 | 16 |
| $H_2O$ | 1,000 | 988 | 722 | 1,000 |
| Removed: | | | | |
| Schoenite | | 2 | | |
| Astrakanite | | | 6.5 | |
| Halite | | | 4.94 | |
| Crystallized $H_2O$ | | 12 | 26 | |
| Evaporated $H_2O$ | | | 240 | |

Reference herein to details of certain specific embodiments is not intended to restrict the claims except to the extent that these details are included in the appended claims. It should be understood, for example, that the invention is generally applicable to the treatment of potassium sulfate plant end liquors resulting from the conversion of potassium-containing materials fed to the plant into hydrated potassium magnesium sulfates. The requirements of such a plant with respect to the specifications of the raw materials processed thereby dictate the compositions possible for the end liquors from the plant. Although these compositions vary widely, they nevertheless comprise a series of related compositions susceptible to treatment by the claimed invention.

The modifiers "essentially" and "substantially," are used herein and in the claims to avoid the implication that the terms modified thereby are to be taken literally. Accordingly, such terms as "essentially pure," "substantially free," and "essentially no," recognize that small amounts of unwanted material may be present in a crystal crop, but that they are present in sufficiently small quantities that they do not seriously affect the overall process. The term "potassium-free sulfate minerals" refers to sulfate-containing minerals such as epsomite, astrakanite, and Glauber salt which contain no potassium in the crystal lattice and is not meant to imply that no potassium is present in the crystal crop. It is recognized that a rigorous chemical analysis of the crystal crops produced by this invention may reveal the presence of inconsequential amounts of potassium contaminant.

I claim:
1. The method which comprises:
   converting potassium-containing double salts of magnesium sulfate to a slurry of schoenite in schoenite-conversion end liquor;
   cooling said schoenite-conversion end liquor sufficiently to cause schoenite to crystallize therefrom until further cooling or evaporation causes essentially no additional schoenite to crystallize, thereby to form a residual brine;
   separating said residual brine;
   subjecting said residual brine to evaporation at a temperature above about 25° C. to produce a crystal product comprising primarily minerals selected from the group consisting of halite, epsomite, and astrakanite; and
   separating the end liquor from said potassium-free, sodium-containing and sulfate-containing minerals.

2. The method of claim 1, wherein the residual brine is evaporated at a temperature between about 30 and about 50° C. to produce a crystal crop comprising astrakanite in admixture with sodium chloride.

3. The method which comprises:
   converting potassium-containing double salts of magnesium sulfate to a slurry of schoenite in schoenite-conversion end liquor;
   cooling said schoenite-conversion end liquor sufficiently to cause schoenite to crystallize therefrom until further cooling or evaporation causes essentially no additional schoenite to crystallize, thereby to form a residual brine;
   separating said residual brine; and
   subjecting said residual brine to cooling sufficient to cause the crystallization of epsomite and Glauber salt.

4. The method of claim 3, wherein
   the residual brine is first cooled sufficiently to form a crystal crop containing at least about 80 percent by weight epsomite, the remainder being principally Glauber salt;
   the resulting epsomite-depleted brine is separated from the epsomite; and
   the epsomite-depleted brine is cooled further to cause the precipitation of Glauber salt.

5. The method of claim 4, wherein the brine is first cooled to about 15° C. to cause the crystallization of epsomite and subsequently cooled to normal winter temperature below about 0° C. to cause the crystallization of Glauber salt.

6. The method of claim 5, wherein the epsomite-depleted brine is cooled to below about $-5°$ C. to cause the crystallization of Glauber salt.

7. The method of claim 3, wherein a mixture of epsomite and Glauber salt is recovered and the mixture is subjected to warming until the Glauber salt decomposes into a sodium sulfate solution.

8. The method of claim 7, wherein the sodium sulfate solution is kept in contact with the epsomite until astrakanite is formed.

9. The method which comprises:
   cooling a schoenite-conversion end liquor containing between about 25 and 37.5 moles $MgSO_4$, up to about 25 moles $MgCl_2$, between about 7.5 and 10 moles $K_2Cl_2$, and between about 17.5 and about 35 moles $Na_2Cl_2$ per 1000 moles of water to below about 25° C., thereby to produce a crystal crop of schoenite and a residual brine;
   separating the residual brine from the schoenite crystal crop;
   subjecting said residual brine to evaporation at a temperature above about 25° C. to produce a crystal crop comprising primarily minerals selected from the group consisting of halite, epsomite, and astrakanite, and a process end liquor;
   recovering said process end liquor; and
   treating said process end liquor for the recovery of potassium values.

10. The method of claim 9, wherein the residual brine is evaporated at a temperature between about 30 and about 50° C. to produce a crystal crop comprising astrakanite in admixture with sodium chloride.

11. The method which comprises:
    cooling a schoenite-conversion end liquor containing between about 25 and 37.5 moles $MgSO_4$, up to about 25 moles $MgCl_2$, between about 7.5 and 10 moles $K_2Cl_2$, and between about 17.5 and about 35 moles $Na_2Cl_2$ per 1000 moles of water to below about 25° C., thereby to produce a crystal crop of schoenite and a residual brine;
    separating the residual brine from the schoenite crystal crop; and
    subjecting said residual brine to cooling sufficient to cause the crystallization of epsomite and Glauber's salt.

12. The method of claim 15, wherein
    the residual brine is first cooled sufficiently to form a crystal crop containing at least about 80 percent by weight epsomite, the remainder being principally Glauber's salt;
    the resulting epsomite-depleted brine is separated from the epsomite; and
    the epsomite-depleted brine is cooled further to cause the precipitation of Glauber's salt.

13. The method of claim 12, wherein the brine is first cooled to about 15° C. to cause the crystallization of epsomite and is subsequently cooled to normal winter temperature below about 0° C. to cause the crystallization of Glauber's salt.

14. The method of claim 13, wherein the epsomite-depleted brine is cooled to below about $-5°$ C. to cause the crystallization of Glauber's salt.

15. The method of claim 11, wherein a mixture of epsomite and Glauber's salt is recovered and the mixture is subjected to warming until the Glauber's salt decomposes into a sodium sulfate solution.

16. The method of claim 15, wherein the sodium sulfate solution is kept in contact with the epsomite until astrakanite is formed.

References Cited
UNITED STATES PATENTS

| | | | |
|---|---|---|---|
| 3,003,849 | 10/1961 | Veronica | 23—128 |
| 3,058,806 | 10/1962 | Ebner | 23—121 |
| 3,342,548 | 9/1967 | Macey | 23—121 |

NORMAN YUDKOFF, Primary Examiner

S. SILVERBERG, Assistant Examiner

U.S. Cl. X.R.

23—302, 304